United States Patent [19]

Egasaki et al.

[11] 4,163,528
[45] Aug. 7, 1979

[54] SPINNING REEL

[75] Inventors: Takashi Egasaki; Hiroshi Kawai, both of Higashikurume, Japan

[73] Assignee: Daiwa Seiko Inc., Tokyo, Japan

[21] Appl. No.: 846,448

[22] Filed: Oct. 28, 1977

Related U.S. Application Data

[63] Continuation of Ser. No. 635,776, Nov. 26, 1975, abandoned.

[51] Int. Cl.² .................. A01K 89/01; A01K 89/02
[52] U.S. Cl. .................. 242/84.21 R; 242/84.51 A
[58] Field of Search .................. 242/84.21 R, 84.2 R, 242/84.2 G, 84.51 R, 84.51 A, 84.5 A, 84.1 R, 84.2 A, 211, 212, 219

[56] References Cited

U.S. PATENT DOCUMENTS

| | | | |
|---|---|---|---|
| 3,123,319 | 3/1964 | Hull | 242/84.51 R |
| 3,144,217 | 8/1964 | Wood, Jr. | 242/84.21 R |
| 3,489,365 | 1/1970 | Hull | 242/84.2 A |
| 3,490,714 | 1/1970 | Underwood et al. | 242/84.46 |
| 3,796,395 | 3/1974 | Rankin, Jr. | 242/212 |

Primary Examiner—Billy S. Taylor
Attorney, Agent, or Firm—Browdy and Neimark

[57] ABSTRACT

A spinning reel for fishing in which a ratchet for inhibiting reverse motion of the rotor and a click gear are provided separately in a sleeve mounted with a rotor, and a holding piece designed to hold both sides of said ratchet is provided to a pawl engaged with said ratchet so that when the rotor rotation reverses, said pawl is automatically engaged with the ratchet by dint of said holding piece connected to said ratchet, and when the rotor rotates forwardly, said pawl separates from the ratchet owing to the holding connection of said holding piece to the ratchet, thus allowing engagement of the pawl and ratchet to prevent rotor reversion with no need of using any spring means therefor. Also, an elastic click pawl is provided engageably with the click gear provided separately from the ratchet, whereby it is possible to optionally select the number of teeth, material, shape, hardening treatment, etc., of the click gear independently of the ratchet, to control or vary the time interval, pitch and reverberation of click sounds or clatters which will be produced by the fishing reel.

2 Claims, 5 Drawing Figures

SPINNING REEL

This is a continuation of application Ser. No. 635,776 filed Nov. 26, 1975, now abandoned.

In the conventional rotor reverse motion inhibiting devices for spinning reel, a pawl elastically pressed by a spring is engaged with a ratchet provided in the master gear mounted on the handle shaft or a ratchet mounted on the rotor sleeve so that said pawl can concurrently act as a click pawl. According to such system, however, since vibration caused by pressing force of the spring attached to the pawl is very frequent and vehement, the spring would be damaged due to fatigue or weakened in its elastic force in long time use. Also, the pawl and ratchet would wear quickly, making the unit unable to stand long time use.

The present invention provides an improved spinning reel arrangement which is free of the said problems inherent to the conventional devices. One prominent feature of the spinning reel according to the present invention is that the pawl is not directly pressed by a spring for inhibiting reverse motion of the rotor by said pawl which is engaged with a ratchet.

It is also an important feature of the present invention that, in the condition where rotor reverse motion is checked, sound is generated by engaging an elastic click pawl with a corresponding click gear provided separately from the ratchet so that the interval of sound generation, pitch, echo, etc., can be adjusted as desired.

According to still another feature of the device of the present invention, the pawl adapted for inhibiting reverse motion and the pawl designed to generate a click sound are operated by a same operating lever to simplify the operation.

More specifically, in the spinning reel according to the present invention, a ratchet for inhibiting reverse motion and a click gear are provided separately in a sleeve mounted with a rotor, and a holding member designed to hold both sides of said ratchet is provided to a pawl engaged with said ratchet so that when the rotor makes a reverse motion, said pawl is automatically engaged with the ratchet owing to the holding connection of the holding member with the ratchet, while when the rotor rotates forwardly, said pawl is separated from the ratchet by dint of said holding connection of the holding member with the ratchet. Thus, proper engagement between the pawl and ratchet can be accomplished with no direct use of any pressing spring, eliminating troubles such as breakdown or weakening of the spring or wear of ratchet and pawl as inevitably caused when using a pressing spring, while also allowing smooth and secure prevention of reverse motion of the rotor.

Also, for generating a click sound when the rotor rotates forwardly in a condition where it is checked against reverse motion, an elastic click pawl is adapted engageable with a click gear provided separagely from the ratchet, so that the tooth number, material, shape, hardening treatment and other matters of the click gear can be freely selected independently of the ratchet, allowing optional adjustment of the interval of sound generation, pitch, etc., of the click sound.

Further, according to the present invention, though the ratchet engaged with the pawl and the click gear engaged with the click pawl are arranged separate from each other, said check pawl and click pawl can be operated by a single operating lever housed in a casing, so that the operation of the device is easy.

The other features of the present invention will become apparent from a review of the following detailed description of the invention as taken in conjunction with the accompanying drawings, in which.

Figure 1:
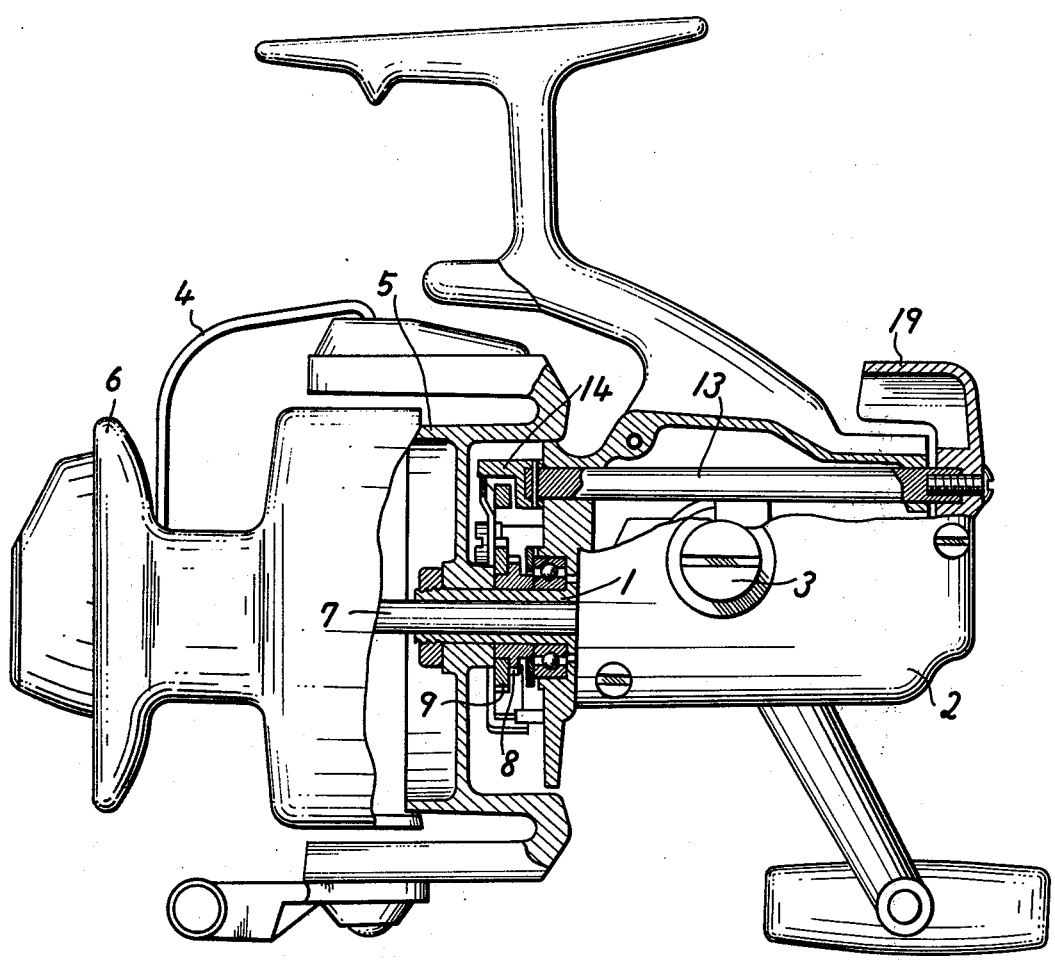
FIG. 1 is a partially cut-out side view of the device according to the present invention.
Figure 2:
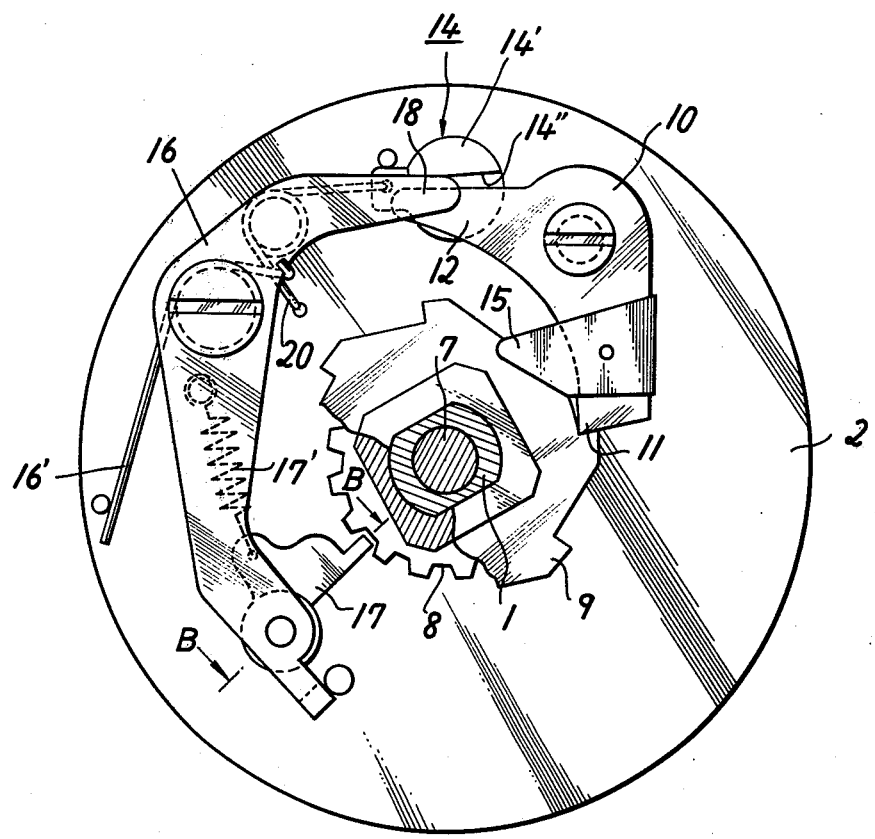
FIGS. 2 and 3 are partially cut-out end views illustrating the modes of operation of the present device.
Figure 5:
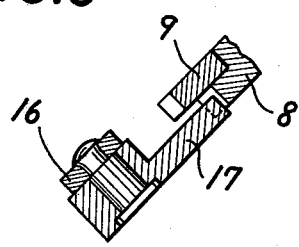
FIG. 5 is a sectional view taken along the line B—B of FIG. 2.

Referring generally to the drawings, a sleeve 1 is rotatably supported in a casing 2 of the spinning reel so that said sleeve is turned integral with the handle shaft 3 in a known way. This sleeve 1 carries at its end a rotor 5 having a veil 4 and also has inserted thereinto the spool shaft 7 on which a spool 6 is mounted. Said spool shaft 7 is arranged reciprocatable slidingly in the sleeve 1 with rotation of the handle shaft 3 in a well-known way. It will be also noted that a click gear 8 and a ratchet 9 are fixed overlapping each other in the outer peripheral portion of the sleeve 1 in the projecting portion of the casing 2 and behind the rotor 5.

At the front end face of the casing 2 is provided a crooked pawl 10 which is pivoted substantially at its center and has integrally formed at its one end an engaging portion 11 and at its other end a working portion 12. Said engaging portion 11 is detachably engaged with a ratchet 9, while said working portion 12 contacts a cam 14 formed at an end of an operating bar 13 supported in the casing 2, said cam 14 having an elevated portion 14′ and a depressed portion 14″. At a part of the pawl 10 positioned slightly toward the pivot from the end of the engaging portion is secured a holding member 15 adapted to hold both sides of the ratchet 9.

Also pivoted at the front end face of the casing 2 is an arm 16 pressed by a spring 16′ and positioned substantially in opposition to the pawl 10 with the ratchet 9 being placed therebetween. At a part of said arm positioned slightly inwardly from its one dnd is pivoted a click pawl 17 pulled by a coil spring 17′ and arranged engageable with said click gear 8. The working portion 18 at the other end of said arm 16 contacts the cam 14. Said operating bar 13 is provided with a finger grip 19 at its portion projecting from the rear end of the casing 2. Also provided at the front end face of the casing 2 are a spring 20 adapted to press the operatinb bar 13 in both directions to the operating position and the non-operating position on both sides of the dead point, and a stopper 21 for the spring 16′.

In operation of the present device described above, when the user operates the finger grip 19 to turn the operating bar 13 to bring about a condition where the elevated portion 14′ of the cam 14 can turn the working portion 12 of the pawl 10 outwardly, the reverse turning behavior of the ratchet 9 induced by reverse motion of the rotor 5 causes corresponding behavior of the holding member 15 to let the engaging portion 11 of the pawl 10 turn inwardly, or clockwise, and engage with the ratchet 9 to inhibit reverse motion of the ratchet 9, thereby checking reversion of the rotor 5. At the same time, the arm 16 is pressed by the spring 16′ and the click pawl 17 at the end of said arm 16 is engaged with the click gear 8, so that when the rotor 5 is rotated forwardly, said click gear 8 rotates while flipping the click pawl 17 to produce a low click sound.

Then, when the operating bar 13 is turned in the opposite direction by properly operating the finger grip 19 so that the elevated portion 14' of the cam 14 will press the working portion 12 of the pawl 10 and the operating portion 18 of the arm 16 inwardly, both engaging portion 11 of said pawl 10 and the click pawl 17 of said arm 16 separated from the ratchet 9 and click gear 8, respectively, allowing the rotor 5 to rotate either forwardly or reversely, and hence no sound is produced by the click pawl 17.

Figure 3:
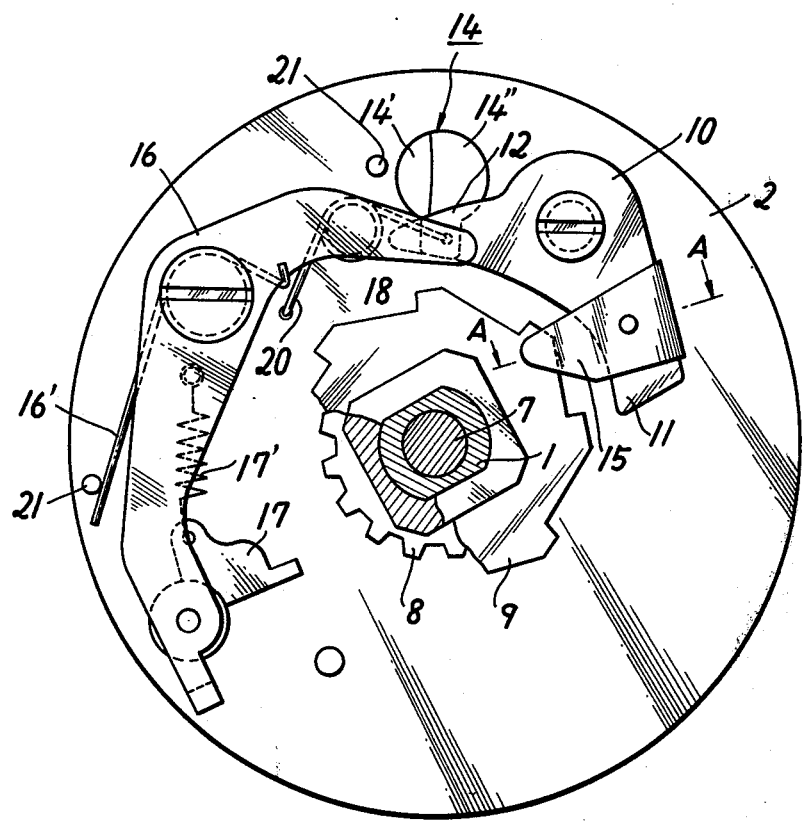
Figure 4:
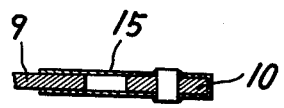
FIG. 4 is a sectional views taken along the line A—A of FIG. 3.

During this operation, the holding piece 15 of the pawl 10 still holds the ratchet 9. Thus, upon the forward rotation, that is, the clockwise rotation (as shown in FIG. 3) of the ratchet 9, the holding piece 15 is urged to make the counter-clockwise rotation whereby the engaging portion 11 of the pawl 10 is kept in the position where it is separated from the ratchet 9. While in the case of counter-clockwise rotation of the ratchet 9, the holding piece 15 has tendency for clockwise rotation about the pivotal point; however, the engaging portion 11 of the pawl 10 is prevented from the engagement with the ratchet because the pawl 10 is in abutment with the cam portion of the operating bar 13.

What is claimed is:

1. In a spinning reel for fishing which includes a casing having an end face; a rotor for engaging a fishing line; a sleeve rotatably supported in said casing; a handle shaft; a spool; and a spool shaft connected to said spool and inserted in said sleeve for sliding reciprocation with movement of said handle shaft to coil the fishing line on said spool upon rotation of said rotor, the improvement comprising a ratchet and a click gear secured to said sleeve; a pawl having an operating portion and means for pivotally mounting said pawl substantially at its center to said end face of said casing; a holding piece fixed to said pawl and movable therewith for holding both sides of said ratchet, said ratchet being positioned with respect to said pawl to be engageable with said pawl; an operating bar supported in said casing, said operating bar having a cam portion at an end thereof for moving said pawl into engagement with said ratchet, said operating portion of said pawl being in contact with said cam portion; an arm having a first and a second end; means for pivotally mounting said arm to said end face of said casing, said arm having a working portion at its second end, said working portion being in contact with said cam portion for moving said first end toward said click gear under action of said cam portion; and an elastic click pawl provided on said first end of said arm, said click pawl being positioned with respect to said click gear to be engageable with said elastic click pawl contemporaneously with engagement between said pawl and said ratchet.

2. A spinning reel according to claim 1, wherein said click pawl comprises a non-elastic pawl member pivotally secured to said arm, and a spring coupled to said pawl member to provide elasticity thereto.

* * * * *